(12) United States Patent
van Rooij

(10) Patent No.: US 8,245,804 B2
(45) Date of Patent: Aug. 21, 2012

(54) ELECTRICAL BICYCLE HUB

(75) Inventor: Jacobus Hubertus Maria van Rooij, Nuenen (NL)

(73) Assignee: Gear Chain Industrial B.V. (NL)

( * ) Notice: Subject to any disclaimer, the term of this patent is extended or adjusted under 35 U.S.C. 154(b) by 1052 days.

(21) Appl. No.: 12/160,748

(22) PCT Filed: Jan. 19, 2007

(86) PCT No.: PCT/NL2007/000017
§ 371 (c)(1),
(2), (4) Date: Aug. 4, 2008

(87) PCT Pub. No.: WO2007/083995
PCT Pub. Date: Jul. 26, 2007

(65) Prior Publication Data
US 2008/0308336 A1   Dec. 18, 2008

(30) Foreign Application Priority Data
Jan. 23, 2006   (NL) ..................................... 1030984

(51) Int. Cl.
*B60K 1/00* (2006.01)
(52) U.S. Cl. .................................. 180/65.51; 180/65.6
(58) Field of Classification Search ............... 180/65.51, 180/65.6
See application file for complete search history.

(56) References Cited

U.S. PATENT DOCUMENTS

| | | | | |
|---|---|---|---|---|
| 4,274,023 A * | 6/1981 | Lamprey | .......................... | 310/83 |
| 5,246,082 A * | 9/1993 | Alber | .......................... | 180/65.51 |
| 5,272,938 A * | 12/1993 | Hsu et al. | ...................... | 74/594.1 |
| 5,581,136 A * | 12/1996 | Li | ................................ | 310/67 R |
| 5,685,798 A * | 11/1997 | Lutz et al. | ...................... | 475/331 |
| 6,355,996 B1 * | 3/2002 | Birkestrand | .................... | 310/54 |
| 6,974,399 B2 * | 12/2005 | Lo | ....................................... | 475/5 |
| 7,249,643 B2 * | 7/2007 | Etzioni et al. | .............. | 180/65.51 |
| 7,392,995 B2 * | 7/2008 | Lin | .............................. | 280/47.31 |
| 7,556,580 B2 * | 7/2009 | Saito et al. | ..................... | 475/154 |
| 7,717,203 B2 * | 5/2010 | Yoshino et al. | ............. | 180/65.51 |
| 7,815,535 B2 * | 10/2010 | Ai et al. | ......................... | 475/149 |
| 7,886,858 B2 * | 2/2011 | Ai | .............................. | 180/65.51 |
| 2005/0029033 A1 * | 2/2005 | Rip et al. | ....................... | 180/220 |
| 2007/0257570 A1 * | 11/2007 | Walter et al. | ................ | 310/67 R |
| 2008/0202832 A1 * | 8/2008 | Ai | ................................ | 180/65.5 |

* cited by examiner

*Primary Examiner* — J. Allen Shriver, II
*Assistant Examiner* — Travis Coolman
(74) *Attorney, Agent, or Firm* — Ryan A. Schneider, Esq.; Troutman Sanders LLP

(57) ABSTRACT

Electrically motorised bicycle hub with a stationary wheel shaft which rotatingly supports a hub housing, in which is provided a rotor which can rotate around the wheel shaft and which comprises—a first part, parallel to the wheel shaft and carrying a ring of permanent magnets which cooperate with a ring of stator windings, supported by a carrier, and a second part rotatingly supported by the wheel shaft and connected to the first part by means of a transition part, and with furthermore a wheel transmission, driven by this second rotor part and which reduces the rotation speed thereof, the output thereof driving the hub housing, this wheel transmission being accommodated in the space between the stator windings and the wheel shaft. Preferably, the first rotor part is rotatingly supported on one of the hub walls opposite thereto while seals are provided between the cylindrical winding carrier and the parts opposite thereto.

12 Claims, 4 Drawing Sheets

ELECTRICAL BICYCLE HUB

Figure 1:
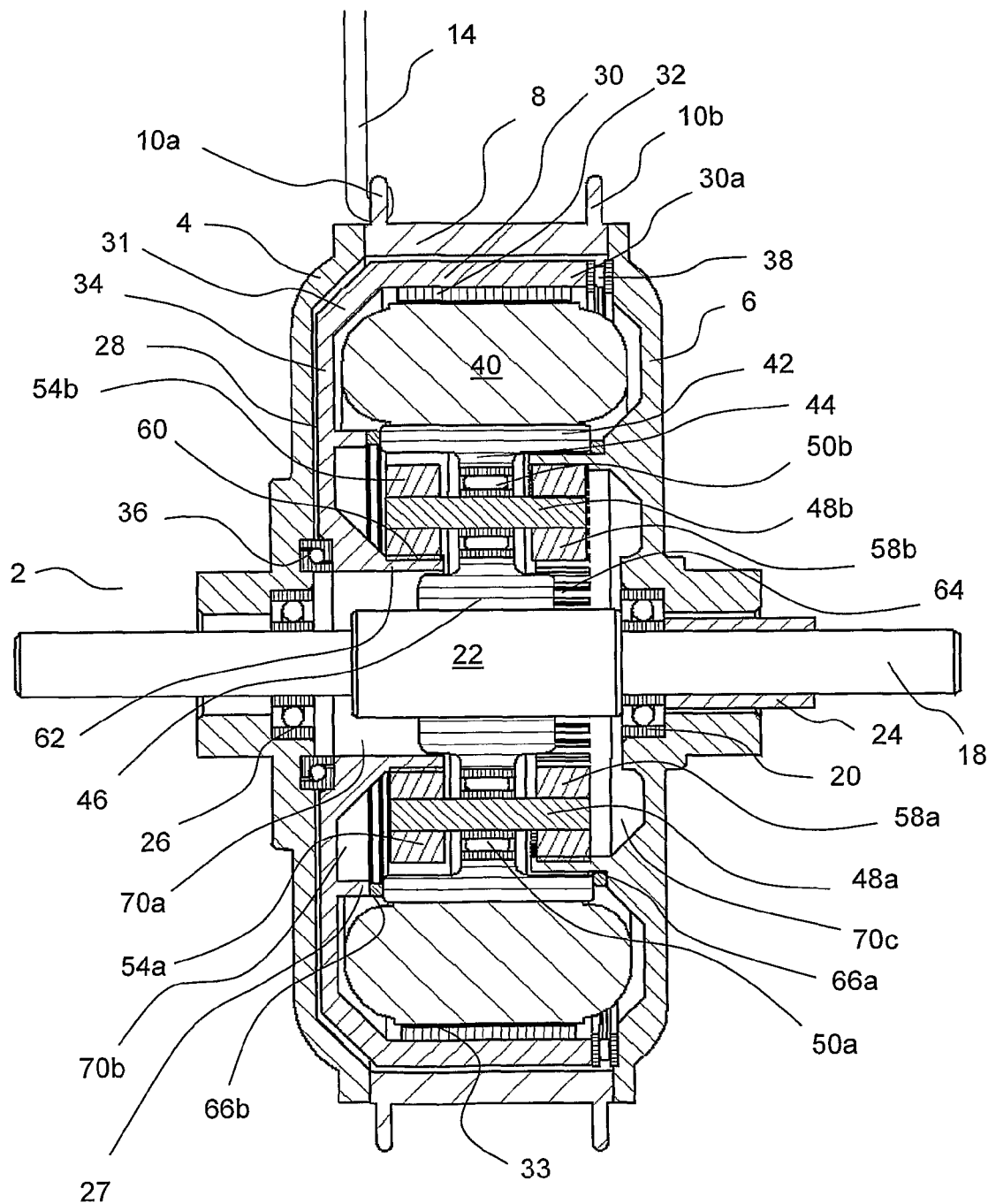

The invention relates to an electrically motorised bicycle hub comprising a stationary wheel shaft and a hub housing, supported rotatingly there around, and enclosing a rotor which can rotate around this shaft and comprises a first part, parallel to the wheel shaft and carrying a ring of permanent magnets which cooperate with a ring of stator windings, supported by a carrier, and a second part, perpendicular to, supported rotatingly around the wheel shaft and connected to said first part by means of a transition part, and furthermore comprising a wheel transmission, driven by this second rotor part and of which the output drives the hub housing with a reduced rotation speed.

Many embodiments of electrical bicycle hubs are known, both from practice and from publications. The embodiments in which the driven rotor is connected directly to the hub, or is constituted by the hub itself, have the drawback that the brushless electric motor, made up by rotor and stator, operates at a low driving speed, necessarily also with an unfavourable, low, rotational speed in which only a small torque can be generated. This drawback is particularly present when the hub is used in a wheel of normal, great, diameter and when climbing hills.

For this reason it has already been proposed (vide for instance GB 2 298 964, WO 03/022671 (SPARTA), CH 27043Y-2004-6-09 and the German Utility Model 20016446.0) to couple the rotor drivingly with a gear wheel transmission accommodated in the hub to lower the rotational speed and to obtain in this way that a certain bicycle speed corresponds to a higher rotor speed, with all the advantages thereof.

In the known structures the transmission is located adjacent to the combination of rotor and stator which in practice means that, with a given width of the hub, there is less room for the combination of rotor and stator. This, however, is unfavourable as far as the generation of the torque is concerned so that the advantages, which are obtained by presence of a transmission, are partly nullified.

The invention aims to obviate these drawbacks. To this end the invention proposes that the wheel transmission is accommodated in the space present between the stator windings and the shaft of the wheel.

The result of these measures is that, despite the presence of the transmission, a maximum space is available to accommodate stator, rotor, and, if any, electronic components.

A first advantageous embodiment of the invention is defined in claim 2.

A second advantageous embodiment is defined in claim 3.

In both the embodiments it is of advantage when the free end of the first rotor part is rotatingly supported on the opposite wall of the hub housing.

Figure 2:
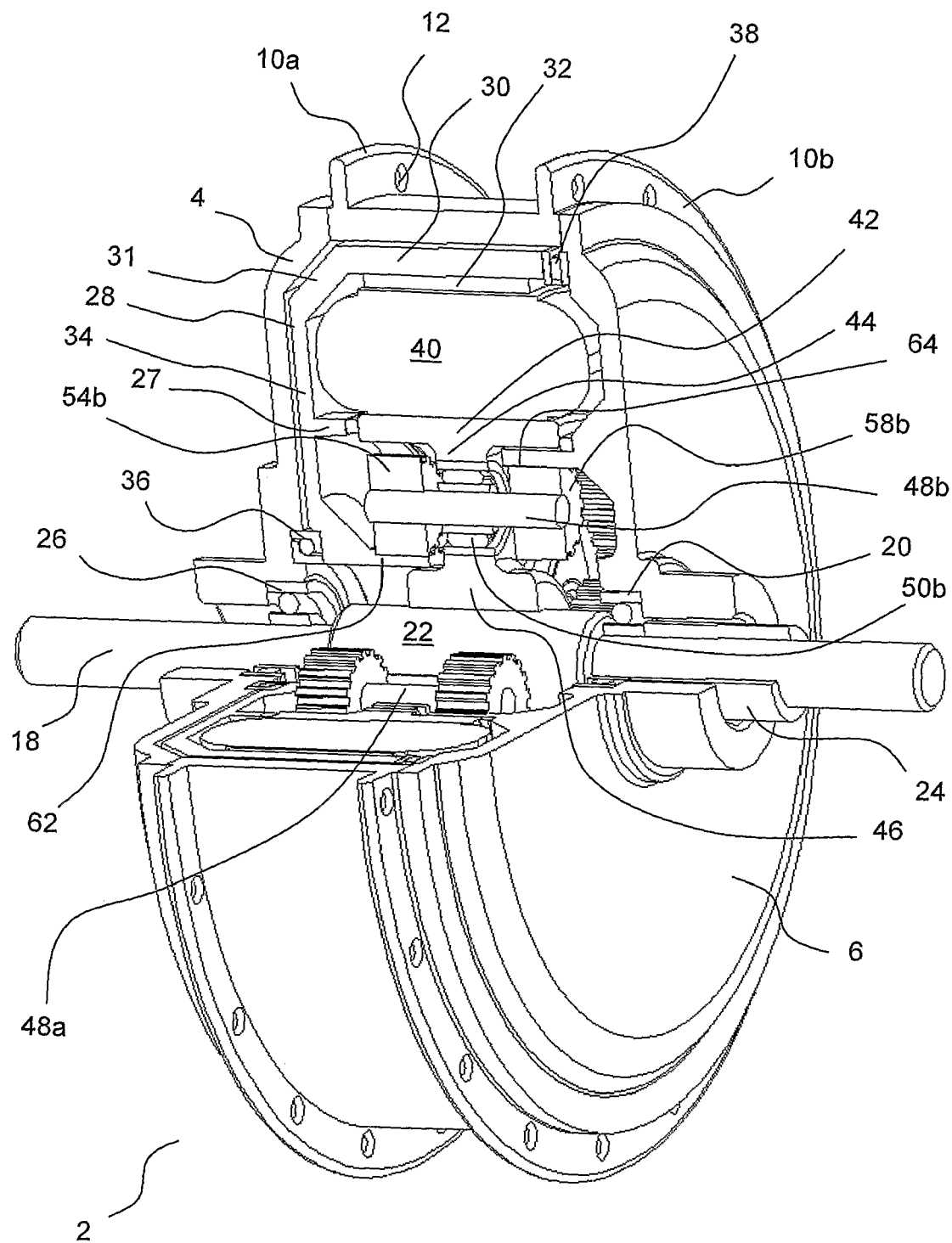
Figure 3:
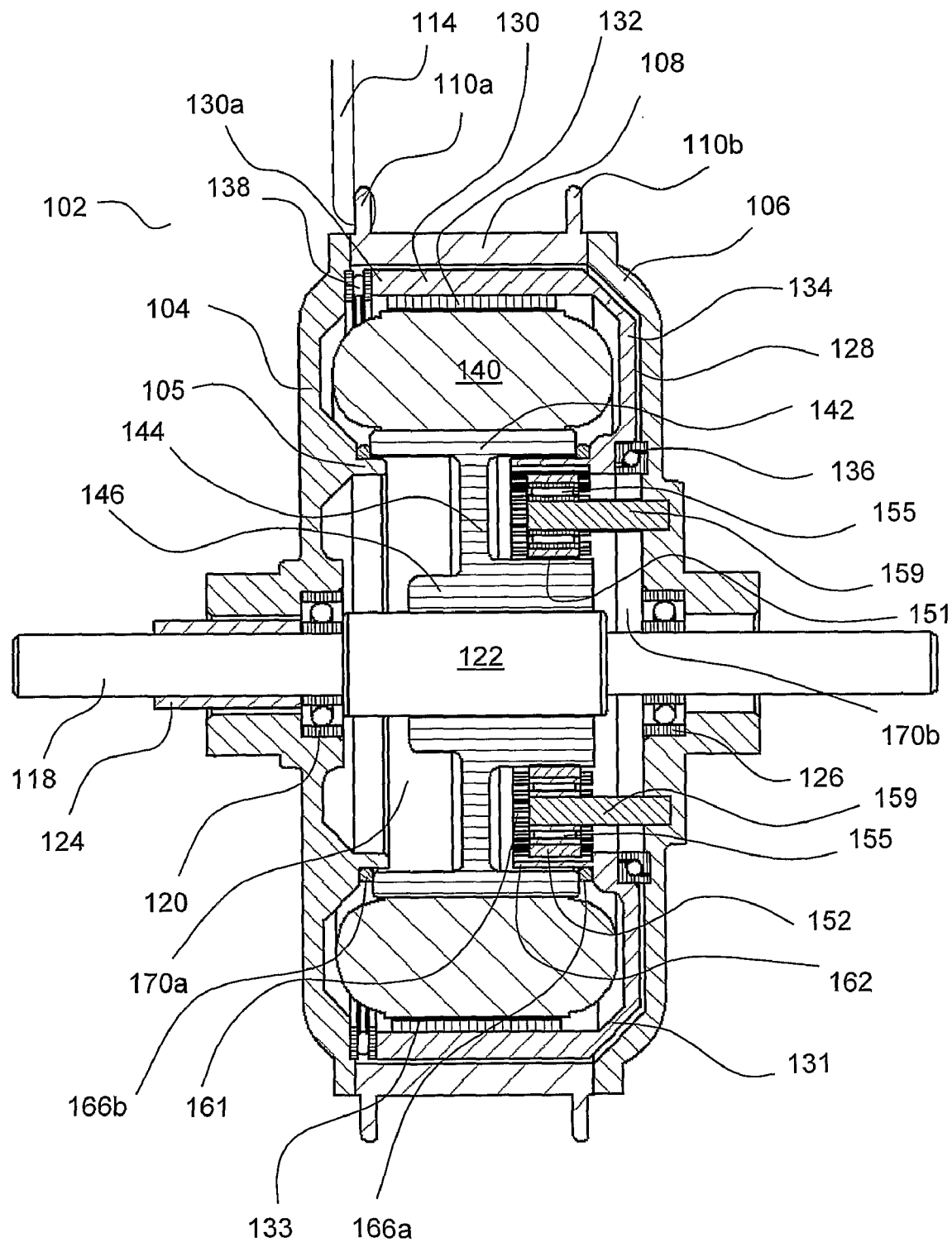
Figure 4:
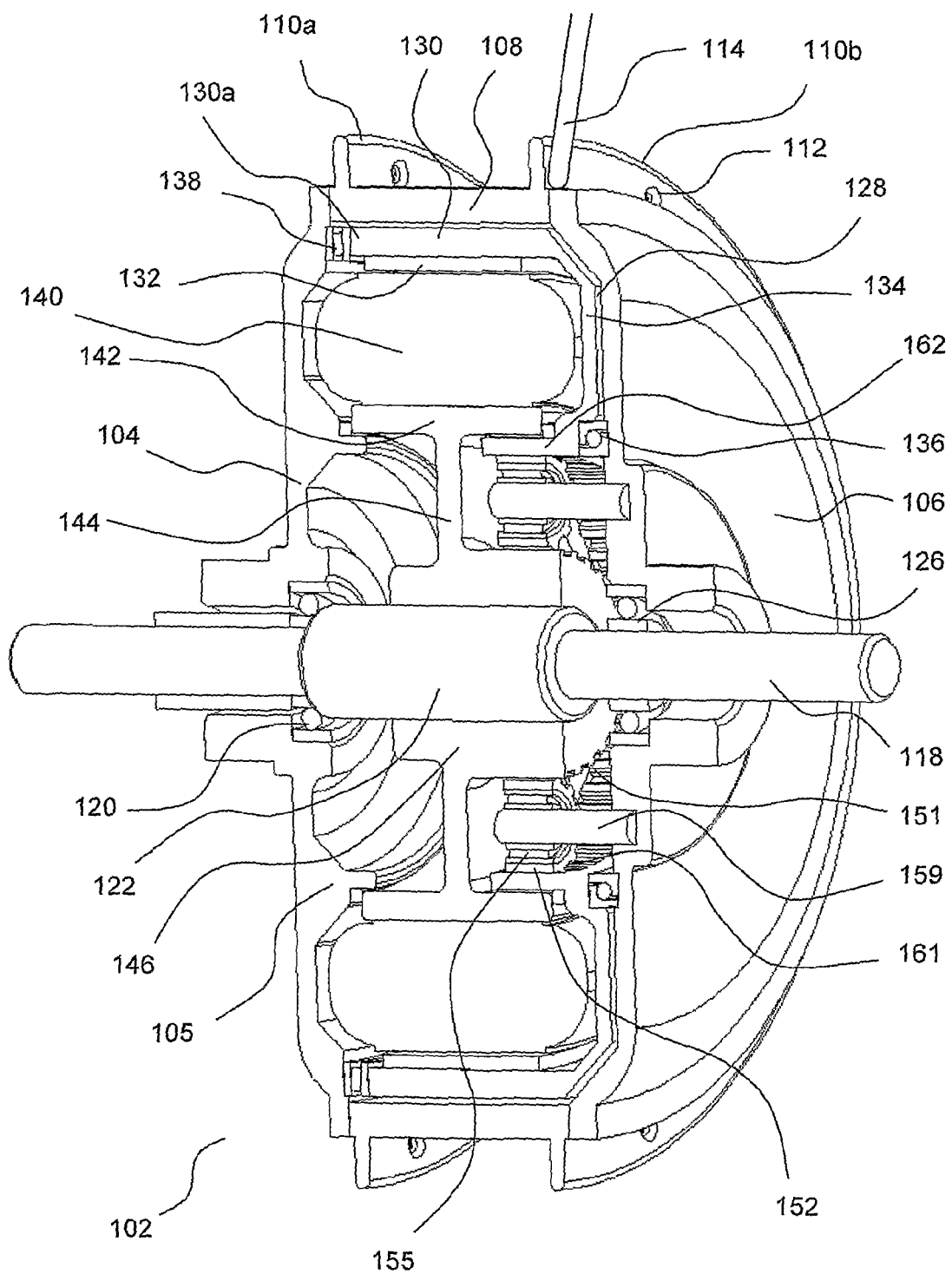

The invention is elucidated on the hand of the drawing. Therein shows:

FIG. 1 a longitudinal cross section of a first embodiment of the wheel hub according to the invention;

FIG. 2 a quarter part cut-away perspective view of this embodiment;

FIG. 3 a longitudinal cross section of a second embodiment of the invention;

FIG. 4 a halve cut-away perspective view of this embodiment.

FIG. 1 shows in longitudinal cross section, and FIG. 2 shows in a for a quarter part cut-away perspective view a first embodiment of an electrically motorized bicycle hub according to the invention in which the hub housing, indicated with reference numeral 2, comprises a left-hand cover 4 and a right-hand cover 6, said covers abutting against a cylindrical housing part 8. The upstanding end edges 10a, 10b of this cylindrical housing part 8 are provided with openings 12 which accommodate the spokes 14; by means of the spokes 14 the hub housing 2 supports a wheel rim, not shown in the drawing.

The left-hand house cover 4 is rotatingly supported around the wheel shaft 40 by means of a first bearing 26; the right-hand house cover 6 is rotatingly supported around this shaft 18 by means of a second bearing 20 which is enclosed between the central shaft part 22 and a bush 24.

The hub housing 2 encloses the usual rotor 28 comprising a cylindrical part 30 which carries at its inner surface a ring of permanent magnets 32 and a second part 34, connected to the first part by means of a transition part 31; this second part 34 is supported by the left-hand cover via the bearing 36 which is preferably an edge contact bearing. The rotor is stabilised by means of a thrust bearing 38, provided between the free end 30a of the first rotor part 30 and the right-hand hub cover 6. It is, of course, also possible to support the rotor 28 rotatingly on the shaft 22 via a bearing. Furthermore it is also possible to position the thrust bearing 38 at the other side of the rotor adjacent to the transition part 31.

The ring of magnets 32 cooperates with the (not shown) stator poles of the packet of stator windings 40 carried by a cylindrical winding carrier 42 which is, by means of a connecting part 44, perpendicular to this shaft, connected to a base 46 which is crimped on the thickened, central, part 22 of the wheel shaft 18. This connecting part 44 carries a number of auxiliary shafts, regularly distributed around its circumference, two of which being shown in the figures and being indicated with reference numerals 48a, 48b; the corresponding bearings are indicated with 50a, 50b.

Each of these auxiliary shafts carries at the first end, which is shown in the drawing at the left-hand side, a first gear wheel 54a, 54b and at the second, right-hand end, a second gear wheel 58a, 58b. The first gear wheels 54a, 54b mesh with outer gear teeth 60, formed at the outer surface of a first cylindrical part 62 protruding from the rotor 28 while the second gear wheels 58a, 58b mesh with inner teeth 64 formed at the inner side of a second cylindrical part which protrudes from the right-hand hub cover 6.

When thus by means of the packet of stator windings 40 and in the usual way a rotating magnetic field is generated in the stator poles the cooperation of the stator windings and the (not shown) stator poles on the one hand, and the ring of magnets 32 on the other hand will result in that the cylindrical rotor part 30 and thus also the second rotor part 34 are driven rotatingly. The cylindrical part 32 drives the rotating gear wheels 54a, 54b which have a fixed position and, with these gear wheels, the shafts 48a, 48b; the rotating movement thereof is transmitted to the gear wheels 58a, 58b, and, via these, to the inner teeth 64 at the inner side of the cylindrical part protruding from the hub cover 6. In this way the entire hub housing 2 and, via the spokes 14, the wheel is driven with a rotating speed which is lower than the rotating speed of the rotor and is determined by the ratio of the diameters of the gear wheels 64 and 60. In practice a transmission ratio of 1:2 can easily be realised. To prevent lubricant or wear dust from migrating from the gear transmission into the space 33 between the ring of permanent magnets 32 and the stator winding packet 40 a first seal 66a can be provided between the right-hand hub cover 6 and the cylindrical winding carrier 42 and a second seal 66b can be provided between the second rotor part 34 and the cylindrical winding bearer 42. To this end the second rotor part 34 is provided with a protrusion 27.

The FIGS. 1 and 2 show that sufficiently free space 70a, 70b and 70c remains for the accommodation of the components of the control electronics.

The second embodiment of the present invention is elucidated on the hand of FIGS. 3 and 4 which show respectively a longitudinal cross section and a, cut-away, perspective view of this embodiment. In the FIGS. 3 and 4 parts which correspond with parts already described on the hand of FIGS. 1 and 2 are indicated with the respective reference numerals as used there but increased by 100.

In these embodiments, too, the hub housing 102 is built up from a left-hand cover 104 and a right-hand cover 106, both covers abutting to the cylindrical housing part 108. The upstanding edges 110a, 110b on the cylindrical housing part 108 are provided with openings 112 accommodating the ends of the spokes 114; by means of these spokes 114 the hub housing 102 carries the wheel rim which is not shown in the drawings.

The left-hand housing cover 104 is rotatingly supported around the wheel shaft 118 by means of a first ball bearing 120 which is enclosed between the broadened central shaft part 122 and the bush 124; the right-hand house cover 106 is rotatingly supported by this shaft 118 by means of a second bearing 126.

The hub housing 102 encloses the usual rotor 128 with a cylindrical part 130 which carries at its inner circumference a ring of permanent magnets 132 and a second rotor part 134, perpendicular to the wheel shaft and connected thereto via a transition part 131 and supported rotatingly, by means of the bearing 136, by the cover 106.1 The rotor is stabilised by a thrust bearing 138 provided between the free end 130a of the first rotor part 130 and the left-hand hub cover 104.

The ring of magnets 132 cooperates with the (not shown) stator poles of the packet of stator windings 140 carried by a cylindrical winding carrier 142 which is, via a transition part 144 which is perpendicular to the wheel shaft, connected with a base 146 crimped on the central, thickened part 122 of the wheel shaft 118.

In this embodiment the base 146 is provided at the cylindrical outer surface thereof with outer teeth 151 which constitute, in fact, the sun wheel of a planetary gear wheel system and this sun wheel 151 cooperates with the ring of planet wheels 152, provided regularly around the shaft 118 and each of them is, by means of a bearing 155, carried by a shaft 159. The right-hand end of these shafts 159 are fixed into the right-hand cover 106.

Each of the planet wheels meshes with a ring of inner teeth 161 formed at the inner side of a cylindrical bush 162 which protrudes from the rotor part 134. In this way during operation the rotation of the rotor 128 is transmitted via the ring of gear wheels 152, which rotate around the teeth 151, to the right-hand cover 106 of the wheel hub 102. To prevent that lubricant or wear dust migrates from the gear wheels to the space 133 which is present between the ring of permanent magnets 132 and the stator windings 140 a seal 166a can be provided between the second rotor part 134 and the cylindrical winding carrier 142. When the part 142 is entirely closed one seal is sufficient but, if necessary, a second seal 166b can be placed between the left-hand hub cover 104 which is to his end provided with the cylindrical protrusion 106, and the cylindrical winding carrier 142.

Here, too, there is sufficient free space to accommodate the electronic components—vide particularly the spaces 170a and 170b in FIG. 3.

The invention claimed is:

1. Electrically motorised bicycle hub comprising a stationary wheel shaft and a hub housing, supported rotatingly there around, and enclosing a rotor which can rotate around the stationary wheel shaft and comprises a first part, parallel to the wheel shaft and carrying a ring of permanent magnets which cooperate with a ring of stator windings, supported by a cylindrical winding carrier, and a second part, perpendicular to the first part, being supported rotatingly around the wheel shaft and connected to said first part by means of a transition part, and furthermore comprising a wheel transmission, driven by the second rotor part and of which the output drives the hub housing with a reduced rotation speed, wherein the wheel transmission is accommodated in the space present between the stator windings and the wheel shaft;

wherein a cylindrical part of the cylindrical winding carrier, supporting the windings, is connected via a connecting part, which is perpendicular to the wheel shaft fixed to this shaft, said connecting part accommodating a ring of auxiliary shafts, each being parallel to the axis of the wheel shaft, and each carrying at a first end, directed towards the second rotor part a first gear wheel and at its opposite, second, end a second gear wheel, the first gear wheels meshing with outer teeth provided on a first cylindrical part protruding from the second rotor part at a short distance from the wheel shaft, the second gear wheels meshing with inner teeth provided on a second cylindrical part protruding axially from an opposite hub wall, opposite thereto; and wherein a free end of the first rotor part, or the transition part, is rotatingly supported by the opposite hub wall.

2. Bicycle hub according to claim 1, wherein a seal is provided between the cylindrical winding carrier and the second rotor part.

3. Bicycle hub according to claim 2, wherein a second seal is provided between the cylindrical winding carrier and the hub housing.

4. Bicycle hub according to claim 1, wherein seals are provided between the cylindrical winding carrier and the hub housing and between the cylindrical winding carrier and the second rotor part.

5. Bicycle hub according to claim 1, wherein the second rotor part is rotatingly supported by the opposite hub wall.

6. Electrically motorised bicycle hub comprising:
a rotor comprising a first rotor part, a second rotor part, a rotor transition part connecting the first rotor part to the second rotor part, a ring of permanent magnets, a ring of stator windings, and a cylindrical winding carrier supporting the stator windings;
a stationary wheel shaft;
a wheel transmission accommodated in a space between the stator windings and the stationary wheel shaft; and
a hub housing supported rotatingly around the stationary wheel shaft, and enclosing the rotor which can rotate around the stationary wheel shaft, the hub housing having a first wall and an opposing second wall;
wherein the first rotor part is parallel to the stationary wheel shaft and carries the ring of permanent magnets which cooperate with the ring of stator windings;
wherein the second rotor part is perpendicular to the stationary wheel shaft and supported rotatingly around the stationary wheel shaft;
wherein the wheel transmission is driven by the second rotor part, and of which the output drives the hub housing with a reduced rotation speed; and
wherein a free end of the first rotor part is rotatingly supported by the second wall of the hub housing.

7. Bicycle hub according to claim 6 further comprising:
a ring of auxiliary shafts, each auxiliary shaft parallel to the axis of the stationary wheel shaft and comprising:
  a first end directed towards the second rotor part, and a second end;
  a first gear wheel carried by the first end of the auxiliary shaft; and
  a second gear wheel carried by the second end of the auxiliary shaft;
a first cylindrical part protruding from the second rotor part at a short distance from the stationary wheel shaft, the first cylindrical part having outer teeth; and
a second cylindrical part protruding axially from the second wall of the hub housing, the second cylindrical part having inner teeth;
wherein the cylindrical winding carrier comprises a cylindrical winding carrier cylindrical part supporting the stator windings, the cylindrical winding carrier cylindrical part connected to the stationary wheel shaft via a connecting part that is perpendicular to the stationary wheel shaft;
wherein the connecting part accommodates the ring of auxiliary shafts; and
wherein the first gear wheels mesh with the outer teeth of the first cylindrical part.

8. Bicycle hub according to claim 6 further comprising a seal between the cylindrical winding carrier and the second rotor part.

9. Bicycle hub according to claim 6 further comprising a seal between the cylindrical winding carrier and the hub housing.

10. Electrically motorised bicycle hub comprising:
a rotor comprising a first rotor part, a second rotor part, a rotor transition part connecting the first rotor part to the second rotor part, a ring of permanent magnets, a ring of stator windings, and a cylindrical winding carrier supporting the stator windings;
a stationary wheel shaft;
a wheel transmission accommodated in a space between the stator windings and the stationary wheel shaft; and
a hub housing supported rotatingly around the stationary wheel shaft, and enclosing the rotor which can rotate around the stationary wheel shaft, the hub housing having a first wall and an opposing second wall;
wherein the first rotor part is parallel to the stationary wheel shaft and carries the ring of permanent magnets which cooperate with the ring of stator windings;
wherein the second rotor part is perpendicular to the stationary wheel shaft and supported rotatingly around the stationary wheel shaft;
wherein the wheel transmission is driven by the second rotor part, and of which the output drives the hub housing with a reduced rotation speed; and
wherein the rotor transition part is rotatingly supported by the second wall of the hub housing.

11. Bicycle hub according to claim 10 further comprising a seal between the cylindrical winding carrier and the second rotor part.

12. Bicycle hub according to claim 10 further comprising a seal between the cylindrical winding carrier and the hub housing.

* * * * *